US012568077B2

(12) United States Patent
Stalling et al.

(10) Patent No.: US 12,568,077 B2
(45) Date of Patent: Mar. 3, 2026

(54) MULTI-FACTOR AUTHENTICATION METHOD AND SYSTEM FOR VIRTUAL REALITY

(71) Applicant: TELEFONICA INNOVACION DIGITAL, S.L.U., Madrid (ES)

(72) Inventors: Lars Stalling, Madrid (ES); Xiaoyuan Yang, Madrid (ES)

(73) Assignee: TELEFONICA INNOVATION DIGITAL, S.L.U., Madrid (ES)

( * ) Notice: Subject to any disclaimer, the term of this patent is extended or adjusted under 35 U.S.C. 154(b) by 287 days.

(21) Appl. No.: 18/387,554

(22) Filed: Nov. 7, 2023

(65) Prior Publication Data

US 2024/0154955 A1     May 9, 2024

(30) Foreign Application Priority Data

Nov. 8, 2022     (EP) .................................... 22383072

(51) Int. Cl.
*H04L 29/06*        (2006.01)
*H04L 9/40*         (2022.01)

(52) U.S. Cl.
CPC ................................. *H04L 63/0838* (2013.01)

(58) Field of Classification Search
CPC . H04L 63/0838; H04L 9/3226; H04L 9/3234; H04L 63/0853; H04L 63/18; G06F 3/011; G06F 21/31; H04W 12/06; H04W 12/068; H04W 12/33
See application file for complete search history.

(56) References Cited

U.S. PATENT DOCUMENTS

| | | | | |
|---|---|---|---|---|
| 6,267,670 | B1 * | 7/2001 | Walker ..................... | G07G 5/00 |
| | | | | 902/23 |
| 10,701,064 | B2 * | 6/2020 | Nair ...................... | H04L 9/0863 |
| 2014/0337634 | A1 | 11/2014 | Starner et al. | |
| 2018/0082304 | A1 * | 3/2018 | Summerlin ........ | G06Q 20/4016 |
| 2018/0124599 | A1 | 5/2018 | Werner et al. | |
| 2018/0165892 | A1 * | 6/2018 | Reybet-Degat ........ | G07C 5/008 |

(Continued)

OTHER PUBLICATIONS

EP Search Report, EP Patent Application No. 22383072.0, dated Apr. 20, 2023, 10 pages.

*Primary Examiner* — Shawnchoy Rahman
(74) *Attorney, Agent, or Firm* — Casimir Jones, S.C.; Brian F. Bradley

(57)            ABSTRACT

A method and system for multi-factor authenticating a user wearing a VR headset (120) comprising a multi-factor authentication application programming interface to interact with a multi-factor authentication provider server (110) and enable the user to create an account in the provider server (110) associated with a secondary device (130). Each one-time code generated by the provider server (110) is received in the secondary device (130) through a secondary communication channel. The one-time code is entered, through a graphical interface (1000) of the VR headset (120), while the user is wearing it, by hearing or seeing the code, received in the secondary device (130), through the VR headset (120). The entered code is sent from the VR headset (120) to the provider server (110) to verify it and determines whether the user is enabled to access the VR application, the access is disabled or the user is asked for another entry of code through the VR headset (120).

6 Claims, 3 Drawing Sheets

(56)         References Cited

U.S. PATENT DOCUMENTS

2018/0357583  A1*  12/2018  Guillemette ........ G06F 13/4282
2019/0124063  A1*   4/2019  Cui ....................... H04L 63/083
2019/0260748  A1    8/2019  Leleu et al.
2021/0192799  A1    6/2021  Miura et al.

* cited by examiner

MULTI-FACTOR AUTHENTICATION METHOD AND SYSTEM FOR VIRTUAL REALITY

CROSS-REFERENCE TO RELATED APPLICATION

The present invention claims priority to EP Patent Application No. 22383072.0 filed Nov. 8, 2022, the entire contents of which are incorporated by reference in its entirety.

TECHNICAL FIELD

The present invention relates generally to computing systems and, specifically, has its application within the virtual reality (VR) systems.

More particularly, the present invention relates to a method and system for authenticating end-users in VR resources through more than one authentication factor.

BACKGROUND OF THE INVENTION

Virtual reality (VR) is a simulated experience that can be similar to or completely different from the real world. Currently, standard virtual reality systems use virtual reality headsets. A virtual reality (VR) headset is a head-mounted device that provides an end-user with immersive experiences via a stereoscopic head-mounted display, which consists of a small screen in front of the eyes that simulate a user's physical presence in a virtual environment. When the user puts on a VR headset, a proper virtual reality experience requires the absence of real-world visual stimulus, so he/she needs to set-up it properly (e.g., via some adjustment strips) in operations that take some time. Every time the user needs to move back and forth from the VR device to the real world (e.g., to read a password, attend a call, etc.) the VR experience suffers a lot, as the operation of taking-off/putting-on a VR device takes some time.

On the other hand, authentication takes place when someone tries to log into a computer resource (such as a network, device, or application). The resource requires the user to supply the identity by which the user is known to the resource, along with evidence of the authenticity of the user's claim to that identity. Simple authentication requires only one such piece of evidence (factor), typically a password. For additional security, the resource may require more than one factor—multi-factor authentication, or two-factor authentication in cases where exactly two pieces of evidence are to be supplied.

More particularly, two-factor authentication (2FA) is well adopted in web2 services to increase password-based security. 2FA is a security layer which makes sure that users trying to access an online service are who they say they are. Instead of granting immediately access to the data after checking the password, users will be asked to provide another information that only the real user knows (PIN, password o answer to a secret question), has (a credit card, a smart-phone or a hardware token) or is (fingerprint, iris or voice print). The second factor needs to be different in nature from the first and ideally be obtained from a secondary -2FA- device via a (secondary) channel.

Second factor authentication solutions are well known for sensitive online services on smartphones, tablets, digital television and personal computers, as well as a variety of security measures and account protection services to make the use of the Internet safer for the online users. For instance, SMS (short message service) is a widely used 2FA channel because the 2FA information is sent through a highly secure channel separate from the Internet.

However, as in the case of VR services, it is difficult and inconvenient for end-users who are wearing a head-mounted display to interact with a secondary 2FA device, such as a smartphone, tablet, TV set, or computer, as the interaction requires removing the headset to obtain and remember the second factor for complete authentication, and then putting the headset back on and re-enter in the virtual reality application.

Therefore, there is a need of allowing two-factor authentication for VR systems without leaving the immersive experience.

SUMMARY OF THE INVENTION

The problems found in prior art techniques are generally solved or circumvented, and technical advantages are generally achieved, by the disclosed embodiments which provide methods and systems to provide virtual reality (VR) applications with a multi-factor authentication mechanism without requiring the user to take off the VR headset and so keeping the user in the immersive experience.

An aspect of the present invention refers to a method of multi-factor authentication for VR headsets which comprises the following steps:

providing a multi-factor authentication (e.g., 2FA), through a multi-factor authentication application programming interface integrated in a VR application and configured to:

interact with a multi-factor authentication provider server configured to generate one or more one-time codes (required for multi-factor authentication) and verify codes entered by a user;

enable the user (the user wearing the VR headset) to create an account in the authentication provider server and associate the account with a secondary device (e.g., smartphone, a smart speaker, an intelligent assistant, a tablet, a personal computer, a laptop, a TV set or any wearable programmable device such as a smartwatch) to establish a secondary communication channel (a secure Internet channel or SMS) between the authentication provider server and the secondary device; and ask the user for an entry of code to access the VR application through the VR headset;

receiving, in the secondary device, each one-time code (e.g., a machine-readable one-time code or a user readable one-time code) generated by the authentication provider server, through the secondary communication channel;

in response to the multi-factor authentication application asking the entry of code, entering, through a graphical interface of the VR headset, the code received by the secondary device, wherein the entering is performed by the user after hearing or seeing the code through the VR headset worn by the user;

sending the entered code from the VR headset to the authentication provider server and I. if the authentication provider server verifying the entered code determines the user is successfully authenticated, sending a notification to the VR headset that the user has access to the VR application;

II. otherwise, the multi-factor authentication application programming interface asks the user for a subsequent entry of code through the VR headset or disables the access to the virtual reality application (e.g., after a given number of failed authentications).

In a first possible embodiment of the present invention, the step of entering by the user the code received in the secondary device, entering the code using the graphical interface of the VR headset, comprises:

receiving an indication in the VR headset to alert the user for hearing through the VR headset worn by the user, the indication prompting the user to request the one-time code by speaking to the secondary device;

the secondary device speaking/spelling, through a speaker of the secondary device, the received one-time code; and entering the code heard by the user in the graphical interface of the VR headset.

In a second possible embodiment of the present invention, the step of entering, by the user, the code received in the secondary device comprises:

receiving an indication in the VR headset to alert the user to see a one-time code through the graphical interface of the VR headset;

displaying on a screen of the secondary device the received one-time code as a user readable code;

opening a (first) pass-through window, in the graphical interface of the VR headset, through which the user sees the one-time code displayed on the screen of the secondary device;

entering the code seen by the user in the graphical interface of the VR headset.

In a third possible embodiment of the present invention, the step of entering, the code, received by the secondary device, in the graphical interface of the VR headset comprises:

receiving an indication in the VR headset to alert the user to see a machine readable code (e.g., QR or barcode) through the graphical interface;

displaying on a screen of the secondary device the received one-time code as the machine readable code;

opening a (second) pass-through window in the graphical interface, through which the end-user sees the screen of the secondary device (130);

displaying a frame inside the opened pass-through window and activating an image recognition engine within the frame;

moving the VR headset by user's head movement to place the machine readable code displayed on the screen of the secondary device inside the displayed frame;

detecting an image by the image recognition engine scanning the code within the frame;

confirming that the detected image comprises the one-time code and is correctly entered.

Another aspect of the present invention refers to a system implementing the multi-factor authentication method for VR headsets (in any of the three possible implementation options) described above, comprising:

a multi-factor authentication provider server configured to generate at least one one-time code for multi-factor authentication and verify codes entered by the user; and a multi-factor authentication application programming interface integrated in a VR application and configured to interact with the authentication provider server, enable the user to create an account in the authentication provider server and associate the account with a secondary device to establish, between the authentication provider server and the secondary device, a secondary communication channel (a secure Internet channel or SMS), and ask the user for an entry of code to access the VR application through the VR headset;

wherein the authentication provider server is further configured to send each generated one-time code to the secondary device through the secondary communication channel and receive a code from the VR headset to be verified, after the code being entered by the user through a graphical interface of the VR headset, in response to the multi-factor authentication application asking the entry of code, and the code being entered after the user hearing or seeing, through the VR headset worn by the user, the one-time code sent to the secondary device; and wherein the multi-factor authentication application programming interface is further configured to, if the authentication provider server verifying the received code determines the user is successfully authenticated, notify to the VR headset that the user has access to the VR application, and otherwise, ask the user for a subsequent entry of code through the VR headset or disable the access to the VR application.

The invention is defined by the independent claims. The dependent claims define advantageous embodiments.

The system in accordance with the above-described aspects of the invention has a number of advantages with respect to the aforementioned prior art, which can be summarized as follows:

The present invention strengthens secure connectivity to VR environments, e.g., to the Metaverse, in a highly user-friendly way, allowing the end-user to stay inside the virtual reality experience.

The multi-factor authentication is only activated when the end-user asks for it, e.g., by providing a URL which defines an access point to the multi-factor authentication provider. Therefore, end-users can change to another multi-factor authentication provider whenever they want.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF EMBODIMENTS

Figure 1:
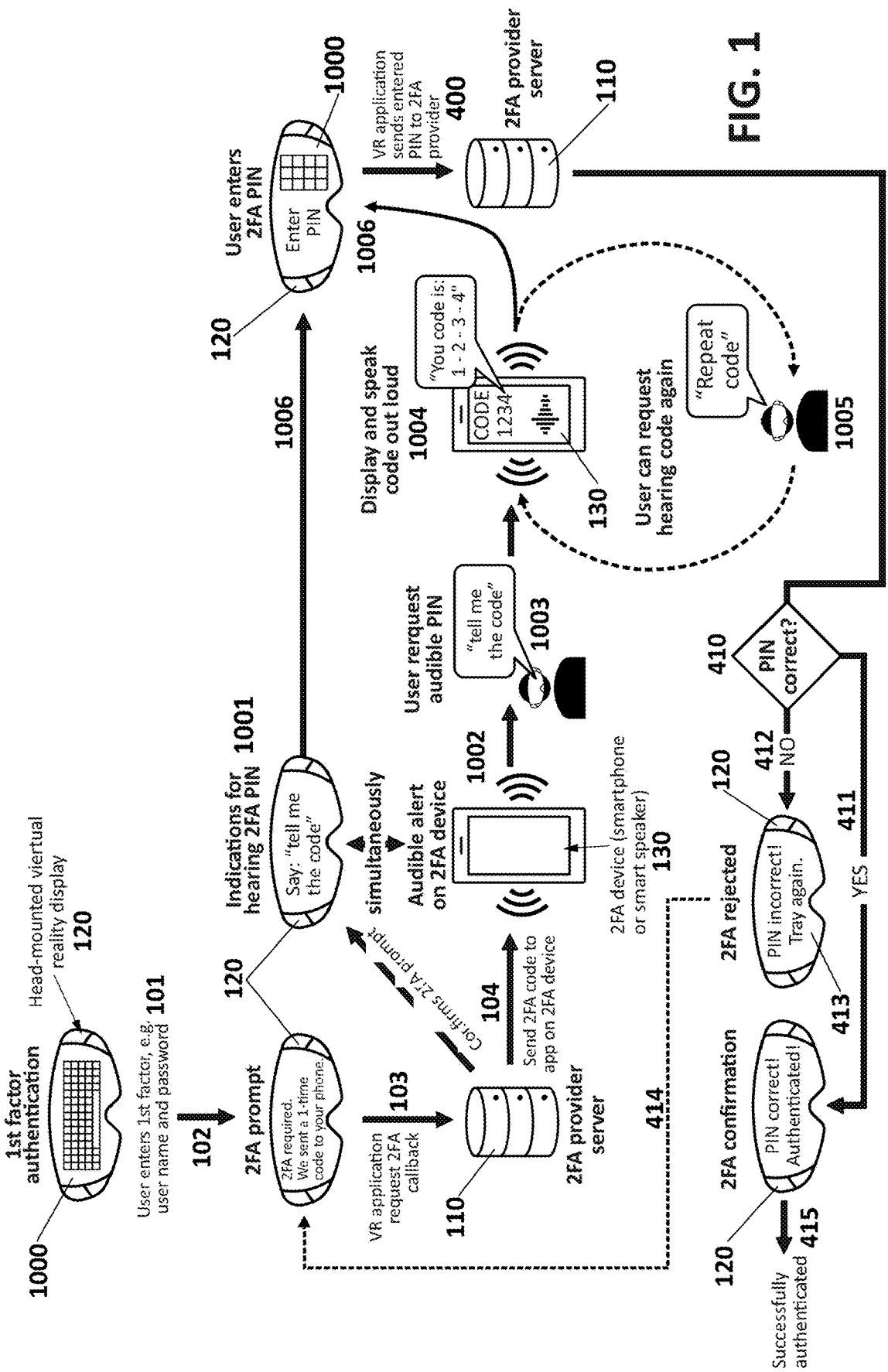
FIG. 1 shows a schematic diagram of two-factor authentication for VR systems, according to a first embodiment of the present invention.

The present invention may be embodied in other specific systems and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The embodiments of the present invention propose a system to provide multifactor authentication, more particularly, a two-factor authentication, 2FA, for virtual reality applications in a convenient and usable way, by providing a 2FA one-time code (which is either machine readable, like a barcode or QR code, or user readable), in a secure way on a secondary 2FA device and the 2FA one-time code being obtained by the user while using the head-mounted display of the VR system, without leaving the VR application. The different embodiments described here allow the user to obtain a 2FA one-time code from a secondary device without having to leave the immersive experience.

The proposed system provides a 2FA method for virtual reality applications, the system comprising the following entities:

a multi-factor authentication (in this example, 2FA) provider server 110: The multi-factor (particularly, two-factor) authentication provider is a service configured to validate whether a user knows a piece of information that only said user knows.

an application programming interface configured to provide multi-factor authentication, e.g., a 2FA API, which is a piece of software that can be integrated in any virtual reality application and interact with the multi-factor authentication provider server 110. The 2FA API provides the following functionalities:

2FA provider initialization for VR application accounts

Ask 2FA for a given password/code (known by the user; this refers to the first factor of the 2FA, while the second factor is a one-time code) and call a callback function with the result The multi-factor authentication provider can be enabled on a VR headset 120, either by installing a multi-factor authentication application or through an API that can be called upon by the multi-factor authentication application that requires authentication.

The multi-factor authentication is built on a client-server model as a distributed application between the provider server 110 and the service requesters or clients. When the multi-factor authentication is requested, the graphical interface on the VR headset 120 provides a code entry mechanism—either through image recognition of a machine-readable code or by allowing the user to read the code using a passthrough functionality provided by the VR headset 120.

The multi-factor authentication application can be implemented on a secondary multi-factor authentication (e.g., 2FA) device 130 in different ways. The secondary device 130 is a programmable device such as a smartphone, smart speaker or intelligent assistant, tablet, personal computer, laptop, TV set or a wearable gadget (e.g., smartwatch). For instance, the user may need to install an application that receives a one-time code generated by the multi-factor authentication provider server 110 through a secondary communication channel, either via SMS or a secure Internet channel. The code, which is either machine readable (e.g., barcode or QR code) or user readable, is verified on the provider server 110 upon user entry.

To enable the interaction between the multi-factor authentication application and the user, the multi-factor authentication provider server 110 needs to communicate with the client side on the VR headset 120 as well as on each secondary device 130. The multi-factor authentication provider server 110 is communicated with the clients, i.e., the VR headset 120 and the, at least one, secondary device 130, through a computer network (e.g., Web2.0 network). The VR headset 120 and the secondary device 130 can be communicated over a wireless network.

Figure 2:
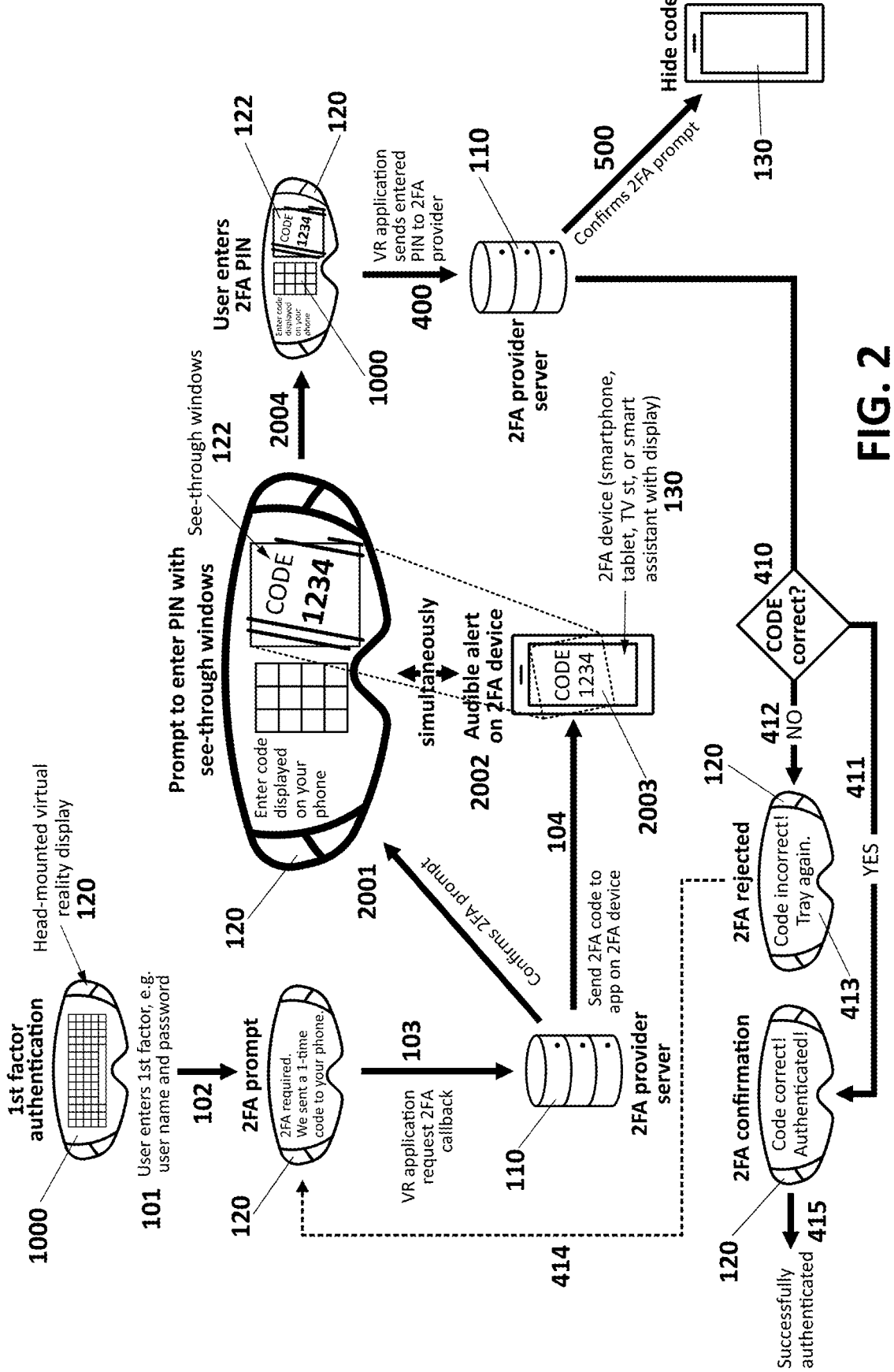
FIG. 2 shows a schematic diagram of two-factor authentication for VR systems, according to a second embodiment of the present invention.
Figure 3:
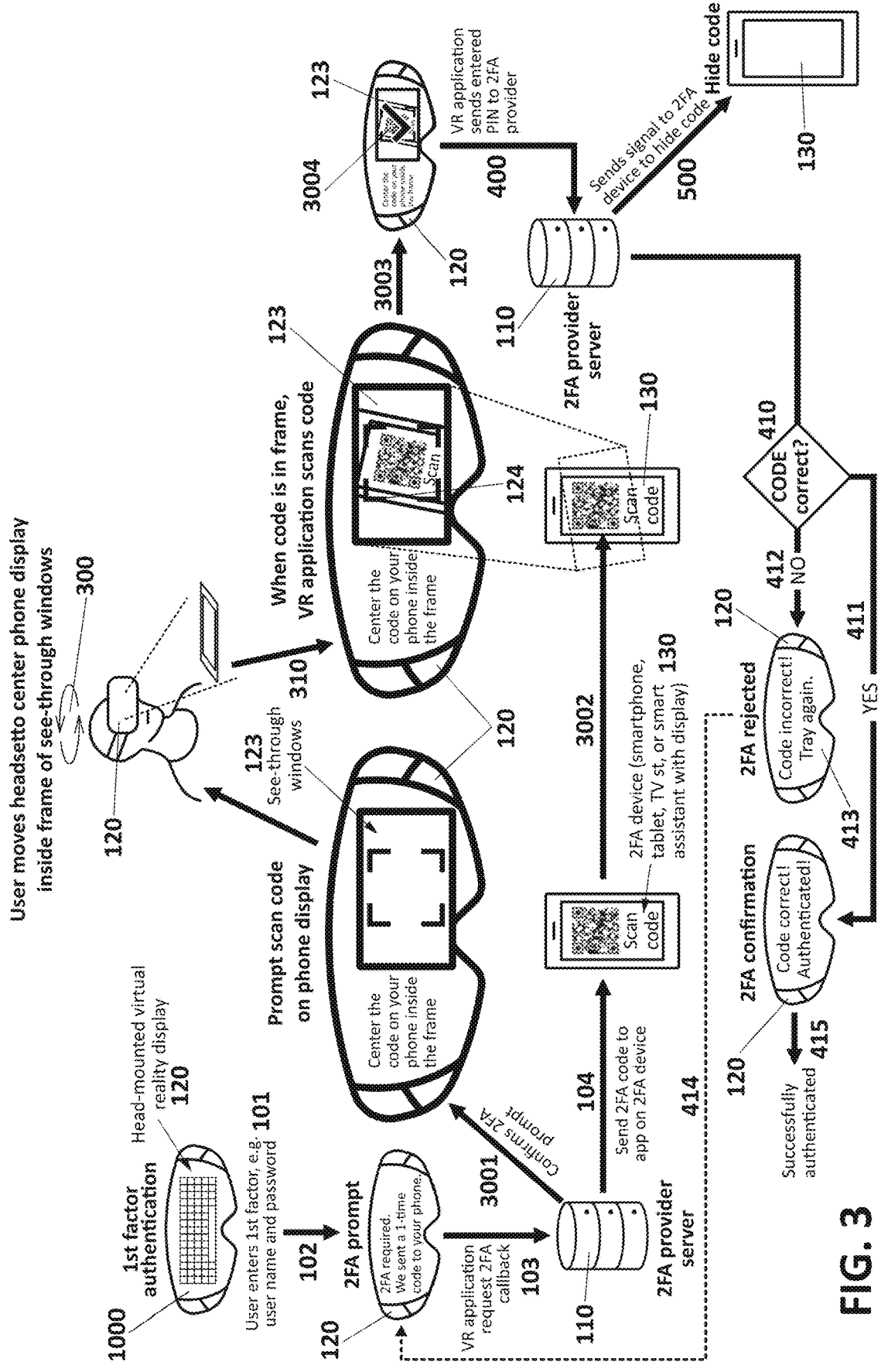
FIG. 3 shows a schematic diagram of two-factor authentication for VR systems, according to a third embodiment of the present invention.

FIGS. 1, 2 and 3 show respectively three different options for communicating the one-time code to the end user while wearing the VR headset 120:

In FIG. 1, the secondary device 130 reads the one-time code out loud (e.g. the smartphone reads out the code audibly through the smartphone speaker), through an audio player or speaker of the secondary device 130, so that the code can be heard through the VR headset 120 worn by the user.

In FIG. 2, a first "pass-through" or "see-through" window 122 is activated on the display of the VR headset 120. This option is only implementable on devices with external cameras and pass-through functionality configured to let the user see the one-time code shown on a separate secondary device 130. The secondary device 130 displays the one-time code in letters large enough and with sufficient contrast to be readable through the window 122 displayed on the VR headset 120. Such interaction requires the secondary device 130 to be in the field of vision of the user delimited by the first window 122 displayed on the VR headset 120.

In FIG. 3, a second "pass-through" or "see-through" window 123 is activated on the display of the VR headset 120 and provided with image recognition functionality. This option is only implementable on devices with external cameras and pass-through functionality configured to read a machine-readable one-time code shown on a separate secondary device 130. The user sees the secondary device 130 and moves 300 the VR headset 120 into a position that places the screen/display of the VR headset 120 into the field of view of the image recognition engine defined by the second window 123. Such interaction requires the secondary device 130 to be in the field of vision of the user delimited by the second window 123 displayed on the VR headset 120.

Given that the one-time code is a passcode that is used only in this very instance and is only locally available, there is, even though the code might be seen or overheard, only minimal risk that third parties can hijack the transaction by intercepting the one-time code.

In a preferred embodiment of the invention, the multi-factor authentication provider server 110 is a 2FA provider server working with an app of the secondary device 130 that is a smartphone, but the same design applies to other 2FA devices such as tablet, smart assistant, personal computer, or TV set.

Three embodiments are illustrated respectively in FIGS. 1-3 and show the following common steps for the two-factor authentication implemented in each of the three embodiments and the different ways to communicate a one-time code (according to the first embodiment shown in FIG. 1, second embodiment shown in FIG. 2 and third embodiment shown in FIG. 3) to the end-user's VR headset 120 from the secondary device 130 (a smartphone in the examples of FIGS. 1-3):

Initial setup: End user accesses (e.g., via a provided URL) a 2FA provider portal and creates a new account with the 2FA provider.

End user associates the new account to a phone number. For instance, the portal of the 2FA provider can send a SMS to the phone number. User needs to type it back in the portal to make sure that said user really has access to the smartphone with this phone number.

End user installs an application of the 2FA provider on the secondary device 130, i.e., the smartphone in the example shown in FIGS. 1-3.

Entering factors for authentication while wearing the VR headset 120:

1. When the user enters a space/service protected by 2FA, the user is prompted to enter a first factor of authentication 101, typically a password known by the user, using a graphical interface 1000 of his/her VR headset 120.
2. When 2FA is enabled after entering the first factor of authentication 101, the user receives a prompt 102 in the VR headset 120 to provide one-time code as 2FA. The VR application sends a callback request 103 to the (2FA) provider server 110.
3. The provider server 110 sends 104 the one-time code to the two-factor authentication application on the secondary device 130, i.e., the smartphone of the end user.
4. The one-time code is communicated to the end-user wearing the VR headset 120 through the 2FA application on the secondary device 130, i.e., the smartphone, by using one of these three options:
   i. Option 1 shown in FIG. 1: voice interaction.
   i.1) User is alerted by the 2FA application on the VR headset 120 using an indication 1001, preferably a sound, for hearing a code or PIN. Simultaneously, an audible alert 1002 is activated by the 2FA application through the speaker or vibration of the secondary device 130, i.e., the phone. The indication 1001 prompts the user to request the one-time code by speaking a keyword, for instance "tell me the code", and prompts the 2FA application on the secondary device 130, i.e., the phone application in the example, to start listening.
   i.2) The user speaks the keyword 1003; e.g., the user says "tell me the code".
   i.3) Upon registering the keyword, the 2FA application on the secondary device 130 reads the one-time code 1004 out loud through the speaker and optionally displays the code on the screen of the secondary device 130, the one-time code having been received by the secondary device 130 via a secondary communication channel; e.g., a SMS received by the phone.
   i.4) In case the user does not understand the one-time code read out by the secondary device 130, the user can request repeating 1005 the read-out of the one-time code, as the 2FA application on the secondary device 130 is still listening. For instance, the user speaks the same keyword or another one, e.g. "repeat the code", which is listened by the phone.
   i.5) The user enters 1006 the one-time code to the 2FA application on the VR headset 120, via the graphical interface 1000 on the VR headset 120.
   ii. Option 2 shown in FIG. 2: user-readable code through pass-through window 122 on VR headset 120.
   ii.1) User is alerted by a sound or visual indication 2001 played by the VR headset 120. The indication 2001 prompts the user to enter the 2FA one-time code. Simultaneously, an audible alert 2002 is activated through the speaker or vibration of the secondary device 130.
   ii.2) The 2FA application running on the secondary device 130 (e.g., the phone) displays 2003 the (user-readable) one-time code in highly readable letters.
   ii.3) The 2FA functionality on the VR headset 120 (either as stand-alone application or through an API) is activated and opens a (first) pass-through window

122 through which the end-user can see the one-time code displayed on the screen of the secondary device 130.
   ii.4) The user enters 2004 the one-time code using the graphical interface 1000 of the VR headset 120.
   iii. Option 3 shown in FIG. 3: image recognition of machine-readable code through pass-through window 123 on VR headset 120.
   iii.1) User is alerted by sound or visual indication 3001 generated by the VR headset 120. The indication 3001 prompts the user to enter the 2FA one-time code.
   iii.2) The 2FA application running on the secondary device 130 (e.g., the phone) displays 3002 a machine-readable one-time code, e.g., a barcode or QR code.
   iii.3) The 2FA functionality on the VR headset 120 (either as stand-alone application or through an API) is activated and opens a (second) pass-through window 123 through which the end-user can see the display/screen of the secondary device 130 and the VR headset 120 displays a frame 124 inside said pass-through window 123 and within which the code can be recognized by an image recognition engine.
   iii.4) The user moves 300 the VR headset 120 in such a way to place 310 the field of vision so that the phone display is visible inside the frame 124.
   iii.5) The 2FA application running in the VR headset 120 scans 3003 the image displayed inside the frame 124 to detect the one-time code.
   iii.6) The 2FA application running in the VR headset 120 automatically confirms that the one-time code is correctly entered 3004.
5. The VR headset 120 sends 400 the one-time code entered by the user to the 2FA (or multi-factor authentication) provider server 110. Optionally, the provider server 110 can send 500 a command/signal to the secondary device 130 to hide the (previously displayed) one-time code. The provider server 110 confirms/determines 410 whether the one-time code entered in the VR headset 120 is correct or not. If the one-time code is correct 411, the user is successfully authenticated 415. If the one-time code is incorrect 412, the user is asked to re-enter 413 the one-time code, going back 414 to the aforementioned step 2 of the process. The number of failed attempts can be determined by the developer of the VR application.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for multi-factor authenticating a user wearing a virtual reality, VR, headset for, the method characterized by comprising the following steps:

providing a multi-factor authentication, through a multi-factor authentication application programming interface integrated in a virtual reality application and configured to:

interact with a multi-factor authentication provider server configured to generate at least one one-time code for multi-factor authentication and verify codes entered by the user;

enable the user to create an account in the authentication provider server and associate the account with a secondary device to establish, between the authentication provider server and the secondary device, a secondary communication channel, which is a secure Internet channel or a short message service, SMS; and ask the user for an entry of code to access the virtual reality application through the VR headset;

receiving each generated one-time code by the secondary device from the authentication provider server through the secondary communication channel, the step of receiving is performed after entering by the user a first factor of authentication using the graphical interface of the VR headset and sending from the VR headset a callback request to the authentication provider server to send the generated one-time code through the secondary communication channel;

in response to the multi-factor authentication application asking the entry of code, entering, through a graphical interface of the VR headset, the code received by the secondary device, the entering being performed by the user after hearing or seeing the code through the VR headset worn by the user;

sending the entered code from the VR headset to the authentication provider server and if the authentication provider server verifying the entered code determines the user is successfully authenticated, sending a notification to the VR headset that the user has access to the virtual reality application;

otherwise, the multi-factor authentication application programming interface asks the user for a subsequent entry of code through the VR headset or disables the access to the virtual reality application.

2. The method according to claim 1, characterized in that, in response to the multi-factor authentication application programming interface asking the entry of code to the user, the VR headset receives a prompt to enter the code received by the secondary device.

3. The method according to claim 1, characterized in that the one-time code generated by the authentication provider server is machine readable or user readable.

4. The method according to claim 1, characterized in that the step of entering, through the graphical interface of the VR headset, the code received by the secondary device, comprises:

receiving an indication by the VR headset to alert the user for hearing through the VR headset, the indication prompting the user to request the one-time code by speaking to the secondary device;

the secondary device speaking through a speaker the received one-time code;

the user entering the heard code in the graphical interface of the VR headset.

5. The method according to claim 1, characterized in that the step of entering, through the graphical interface of the VR headset, the code received by the secondary device, comprises:

receiving an indication by the VR headset to alert the user to see a user readable code through the graphical interface;

displaying on a screen of the secondary device the received one-time code as the user readable code;

opening, in the graphical interface, a first pass-through window through which the user sees the one-time code displayed on the screen of the secondary device;

the user entering the seen code in the graphical interface of the VR headset.

6. The method according to claim 1, characterized in that the step of entering, through the graphical interface of the VR headset, the code received by the secondary device, comprises:

receiving an indication by the VR headset to alert the user to see a machine readable code through the graphical interface;

displaying on a screen of the secondary device the received one-time code as the machine readable code;

opening, in the graphical interface, a second pass-through window through which the end-user sees the screen of the secondary device;

displaying a frame inside the second pass-through window and activating an image recognition engine within the frame;

moving the VR headset by user's head movement to place the machine readable code displayed on the screen of the secondary device inside the frame of the second pass-through window;

detecting an image by the image recognition engine scanning the frame;

confirming that the detected image comprises the one-time code and is correctly entered.

\* \* \* \* \*